US007632367B2

(12) United States Patent
Smith

(10) Patent No.: US 7,632,367 B2
(45) Date of Patent: Dec. 15, 2009

(54) PARCEL LABELING, CONVEYING, AND SORTING METHOD AND APPARATUS

(75) Inventor: Steven L. Smith, Buford, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 452 days.

(21) Appl. No.: 11/104,870

(22) Filed: Apr. 13, 2005

(65) Prior Publication Data

US 2006/0231209 A1 Oct. 19, 2006

(51) Int. Cl.
*B32B 41/00* (2006.01)

(52) U.S. Cl. ......................... 156/64; 700/215; 700/225; 700/226; 700/227; 209/559; 209/583

(58) Field of Classification Search ................. 700/215, 700/225, 226, 227; 156/64; 209/559, 583
See application file for complete search history.

(56) References Cited

U.S. PATENT DOCUMENTS

| | | | |
|---|---|---|---|
| 4,046,613 | A | 9/1977 | Kucheck et al. |
| 4,089,725 | A | 5/1978 | Crankshaw et al. |
| 4,124,429 | A | 11/1978 | Crannkshaw |
| 4,201,621 | A | 5/1980 | Crankshaw et al. |
| 4,210,484 | A | 7/1980 | Crankshaw et al. |
| 4,255,220 | A | 3/1981 | Kucheck et al. |
| 4,314,869 | A | 2/1982 | Crankshaw |
| 4,337,108 | A | 6/1982 | Crankshaw et al. |
| 4,378,665 | A | 4/1983 | Crankshaw et al. |
| 4,390,386 | A | 6/1983 | Bartl |
| 4,473,429 | A | 9/1984 | Crankshaw |
| 4,475,978 | A | 10/1984 | Bartl |
| 4,566,933 | A | 1/1986 | Crankshaw et al. |
| 4,612,079 | A | 9/1986 | Ostrow |
| 4,685,982 | A | 8/1987 | Kucheck |
| 4,830,701 | A | 5/1989 | Crankshaw et al. |
| 4,844,771 | A | 7/1989 | Crankshaw et al. |
| 5,050,720 | A | 9/1991 | Crankshaw |

(Continued)

FOREIGN PATENT DOCUMENTS

| | | |
|---|---|---|
| CA | 1175395 | 10/1984 |

(Continued)

OTHER PUBLICATIONS

International Search Report for PCT Application No. PCT/US06/13692, filed Apr. 11, 2006.

*Primary Examiner*—George R Koch, III
(74) *Attorney, Agent, or Firm*—Alston & Bird LLP

(57) ABSTRACT

An apparatus and method of using same is provided which includes the use of an apparatus configured to scan and apply labels to parcels moving along a conveyor belt. The apparatus of the present invention includes first and second adjacent conveyors positioned with a gap there between, the gap being sufficiently narrow to allow passage of parcels from the first conveyor to the second conveyor. Parcels crossing the gap are exposed to a reading device having a reading axis passing upwardly through the gap to read indicia. The labels, which are scanned and decoded, provide information which is subsequently sent to a printing device which prints a "second" label which is blown or otherwise transferred to a second side of the parcel. The parcel then exits the second conveyor to be sorted downstream by use of the second label.

8 Claims, 5 Drawing Sheets

U.S. PATENT DOCUMENTS

| | | | | |
|---|---|---|---|---|
| 5,050,725 | A | 9/1991 | Newell et al. | |
| 5,117,965 | A | 6/1992 | Newell et al. | |
| 5,421,948 | A | 6/1995 | Crankshaw et al. | |
| 5,425,823 | A | 6/1995 | Woodside, III | |
| 5,550,745 | A * | 8/1996 | Wurz | 700/215 |
| 5,645,669 | A | 7/1997 | Crankshaw et al. | |
| 5,748,899 | A | 5/1998 | Aldrich | |
| 5,853,530 | A | 12/1998 | Allen | |
| 5,971,051 | A | 10/1999 | Crankshaw | |
| 6,002,125 | A * | 12/1999 | Schubert | 250/223 R |
| 6,116,653 | A | 9/2000 | Oberholzer et al. | |
| 6,189,935 | B1 | 2/2001 | Oberholzer et al. | |
| 6,202,700 | B1 | 3/2001 | Bevilacqua | |
| 6,264,042 | B1 * | 7/2001 | Cossey et al. | 209/559 |
| 6,352,094 | B1 | 3/2002 | Gunderson et al. | |
| 6,378,590 | B1 | 4/2002 | Allen et al. | |
| 6,471,803 | B1 | 10/2002 | Pelland | |
| 6,481,350 | B2 | 11/2002 | Masayuki et al. | |
| 6,484,066 | B1 * | 11/2002 | Riess et al. | 700/217 |
| 6,490,821 | B1 | 12/2002 | Lacek | |
| 2002/0088550 | A1 | 7/2002 | Allen et al. | |
| 2004/0004119 | A1 * | 1/2004 | Baldassari et al. | 235/384 |
| 2004/0159402 | A1 | 8/2004 | Guidine et al. | |
| 2004/0206461 | A1 | 10/2004 | Guidine et al. | |

FOREIGN PATENT DOCUMENTS

| | | |
|---|---|---|
| CA | 1201415 | 3/1986 |

* cited by examiner

PARCEL LABELING, CONVEYING, AND SORTING METHOD AND APPARATUS

BACKGROUND OF THE INVENTION

1. Field of the Invention

The present invention relates generally to the reading and placement of labels, markings, or other items on parcels or other items being conveyed along a conveying path and the subsequent sortation of such items.

2. Description of Related Art

The prior art includes many different methods and apparatuses for applying labels to parcels or other items to parcels as they pass along a conveying path. However, there are always needs in the art and improvements needed thereto.

BRIEF SUMMARY OF THE INVENTION

The present invention overcomes the deficiencies of the prior art by providing a method and apparatus for attaching labels or other articles to parcels or other items.

Generally described, the invention is directed towards a conveying and labeling apparatus for receiving a parcel having first indicia thereon on a first side and for providing second indicia atop a second side of the parcel, the apparatus comprising: a first conveying device configured to accept the parcel from an outside source such that the first side is directed towards a first direction and for conveying the parcel along a first conveying path, a second conveying device for receiving the parcel from the first conveying device and for conveying the parcel along a second conveying path, the first and second conveying devices defining a gap therebetween, an indicia reading device for reading the first indicia on the first side of the parcel as the parcel is transferred across the gap between the first conveying device and second conveying device, the indicia reading device configured to view the first indicia along a reading axis, and an indicia adding device for providing second indicia atop the second surface of the parcel while the parcel is atop the second conveying device and traveling along the second conveying path.

The invention is further directed towards a conveying and labeling apparatus for receiving a parcel having first indicia thereon on a first side and for providing second indicia atop a second side of the parcel, the apparatus comprising: a first conveying device including spaced apart placement indicia thereon, the first conveying device configured to accept the parcel from an outside source atop the placement indicia such that the first side is directed towards a first direction and for conveying the parcel along a first conveying path, a second conveying device for receiving the parcel from the first conveying device and for conveying the parcel along a second conveying path, the first and second conveying devices defining a gap therebetween, an indicia reading device for reading the first indicia on the first side of the parcel as the parcel is transferred across a gap between the first conveying device and the second conveying device, the indicia reading device configured to view the first indicia along a reading axis, a parcel location estimating device for estimating parcel location on the second conveying device, and a label adding device for providing a label, with second indicia thereon, atop the second surface of the parcel while the parcel is atop the second conveying device and traveling along the second conveying path.

The invention is further directed towards a conveying and labeling apparatus for receiving a plurality of parcels each having first indicia thereon on a first side and for providing second indicia atop a second side of the parcel, the apparatus comprising: a first conveying device configured to accept the plurality of parcels from an outside source such that the first side of each of the parcels is directed towards a first direction and for conveying the parcels along a first conveying path, a second conveying device for receiving the plurality of parcels from the first conveying device and for conveying the plurality of parcels along a second conveying path, the first and second conveying devices defining a gap therebetween, an indicia reading device for reading the first indicia on the first side of each of the plurality of parcels as each of the plurality of parcels is transferred across the gap between the first conveying device and second conveying device, the indicia reading device configured to view the first indicia along a reading axis, an indicia adding device for providing the second indicia on a label atop the second surface of each of the plurality of parcels while each of the parcels is atop the second conveyor and traveling along the second conveying path, the indicia adding device blowing the labels through the air to contact the parcels, the indicia adding device including a holding portion configured to hold the labels prior to being blown, the holding portion being a label holding portion distance above the portion of the second conveyor proximate the location the parcels are labeled, and a parcel height limiting device positioned above the first conveying device, the parcel height limiting device configured to discourage parcels having a height equal to or greater than the label holding portion distance, such that the plurality of parcels do not interfere with the indicia adding device along the second conveying path.

The invention is further directed towards a method for receiving a plurality of parcels each having first indicia thereon on a first side and for providing second indicia atop a second side of the parcel, the method comprising the steps of: conveying the parcels on a first conveying device configured to accept the parcels from an outside source such that the first side of each of the parcels is directed towards a first direction and each of the parcels are conveyed along the first conveying device, transferring the parcels on the first conveying device to the second conveying device across a gap between the first and second conveying devices and for conveying the parcels along the conveying device, reading the first indicia on each the first side of the parcels as each the parcel is transferred across the gap between the first conveying device and second conveying device, the indicia reading device configured to view the first indicia along a reading axis, and providing second indicia atop the second surface of the parcel while each of the parcels is atop the second conveying device and traveling along the second conveying path.

Therefore it is an aspect of the present invention to provide an improved method and apparatus for parcel labeling, conveying, and sorting objects such as parcels.

It is a further aspect of the present invention to provide an improved method and apparatus for parcel labeling, conveying, and sorting objects such as parcels, which is efficient in operation.

It is a further aspect of the present invention to provide an improved method and apparatus for parcel labeling, conveying, and sorting objects such as parcels, which is effective in operation.

It is a further aspect of the present invention to provide an improved method and apparatus for parcel labeling, conveying, and sorting objects such as parcels, which accommodates operator variables.

It is a further aspect of the present invention to provide an improved method and apparatus for parcel labeling, conveying, and sorting objects such as parcels, which can accommodate a variety of objects.

It is a further aspect of the present invention to provide an improved apparatus for parcel labeling, conveying, and sorting objects such as parcels, which is compact in operation.

Other objects, features, and advantages of the present invention will become apparent upon reading the following detailed description of the preferred embodiment of the invention when taken in conjunction with the drawing and the appended claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
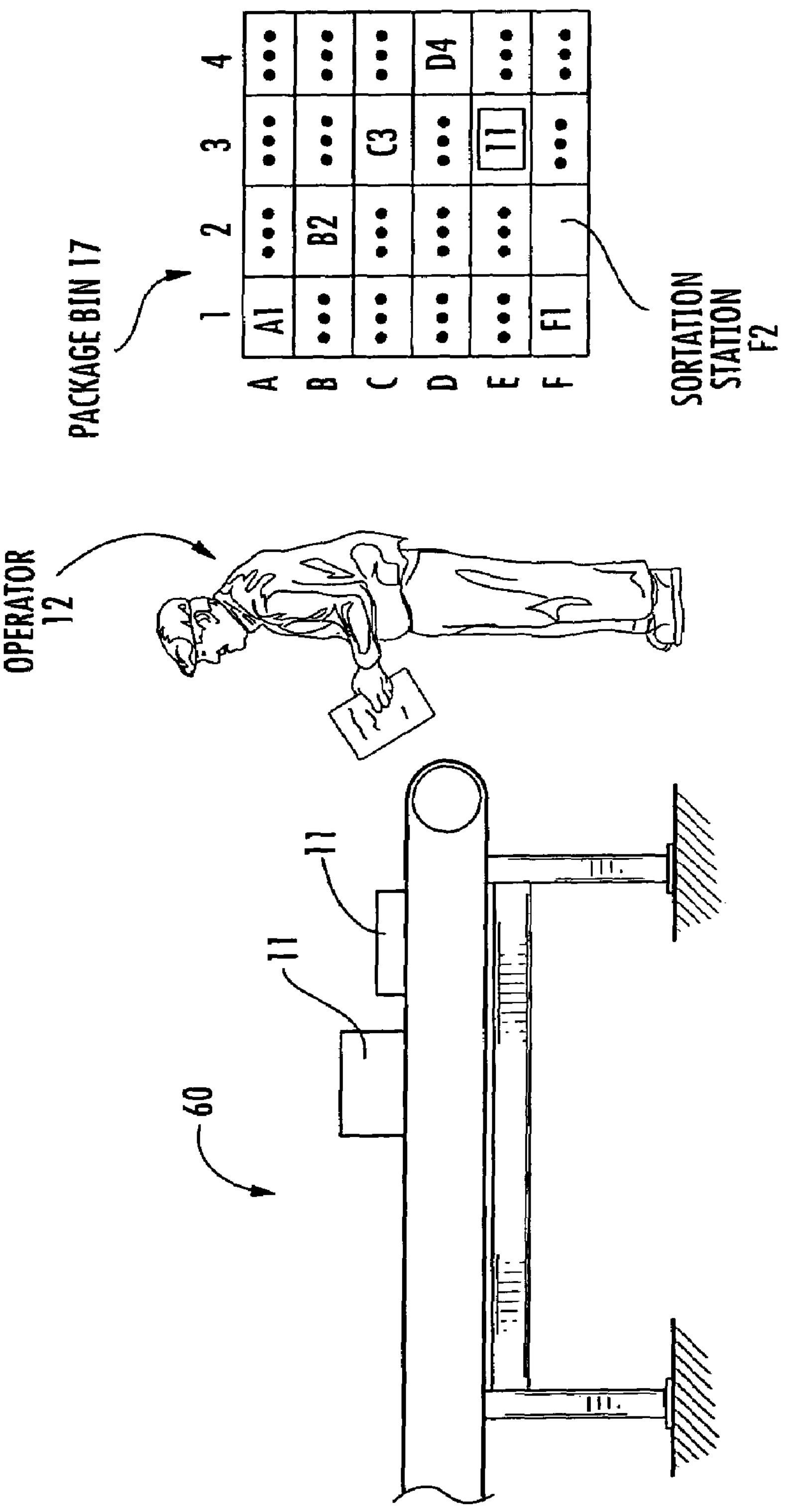

FIG. 5 shows an illustrative view of a package sortation bin 17, located downstream from the apparatus 10. In this embodiment, the operator 12 is responsible for loading the packages into the package sortation bin 17.

DETAILED DESCRIPTION OF THE INVENTION

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overall Assembly and Construction

Generally described, the method and apparatus according to the present invention includes the use of first and second adjacent conveyors with a gap therebetween, the gap being sufficiently narrow to allow passage of parcels placed on the first conveyor by an operator to be conveyed from the first conveyor to the second conveyor. Parcels crossing the gap are exposed to a reading device having a reading axis passing upwardly through the gap to read indicia, typically a code on a "first" label, on the side of the parcel which contacted the first conveyor belt prior to the parcel reaching the gap. This same side is the side which contacts the belt of the first and second conveyors. After processing information relating to the read indicia, a processing device sends information to a printing device which prints a "second" label which is blown or otherwise transferred to a second side of the parcel, which in one embodiment opposes the first side, while the label is on the second conveyor. The parcel then exits the second conveyor to be sorted downstream by use of the second label.

Other features under the invention relate to the use and relative positioning of a height limiting device proximate the first conveyor to limit the height of parcels conveyed thereon, and the use of said limiting device in conjunction with a printer/applicator at a suitably positioned height. Other features include the use of positioning assistance indicia on the first conveyor belt, and processing features relating to the positioning of the label on the typically upwardly-facing second parcel side.

Other features include the use of the invention to include the use of information related to sortation stations downstream of the conveyors, suitable to allow for information to be provided on the second labels which facilitates improved sorting of the parcels into various sortation stations. This information can be altered as desired to facilitate changes in the configuration of the sortation stations such that such changes can be readily and quickly accommodated in the sortation process.

Finally, features of the invention include accommodation of the apparatus and method to accommodate variables introduced by human operators loading parcels on the first conveyor, both between different operators and between different levels of performance a particular operator may provide over a time period.

More Detailed Discussion

Figure 1:
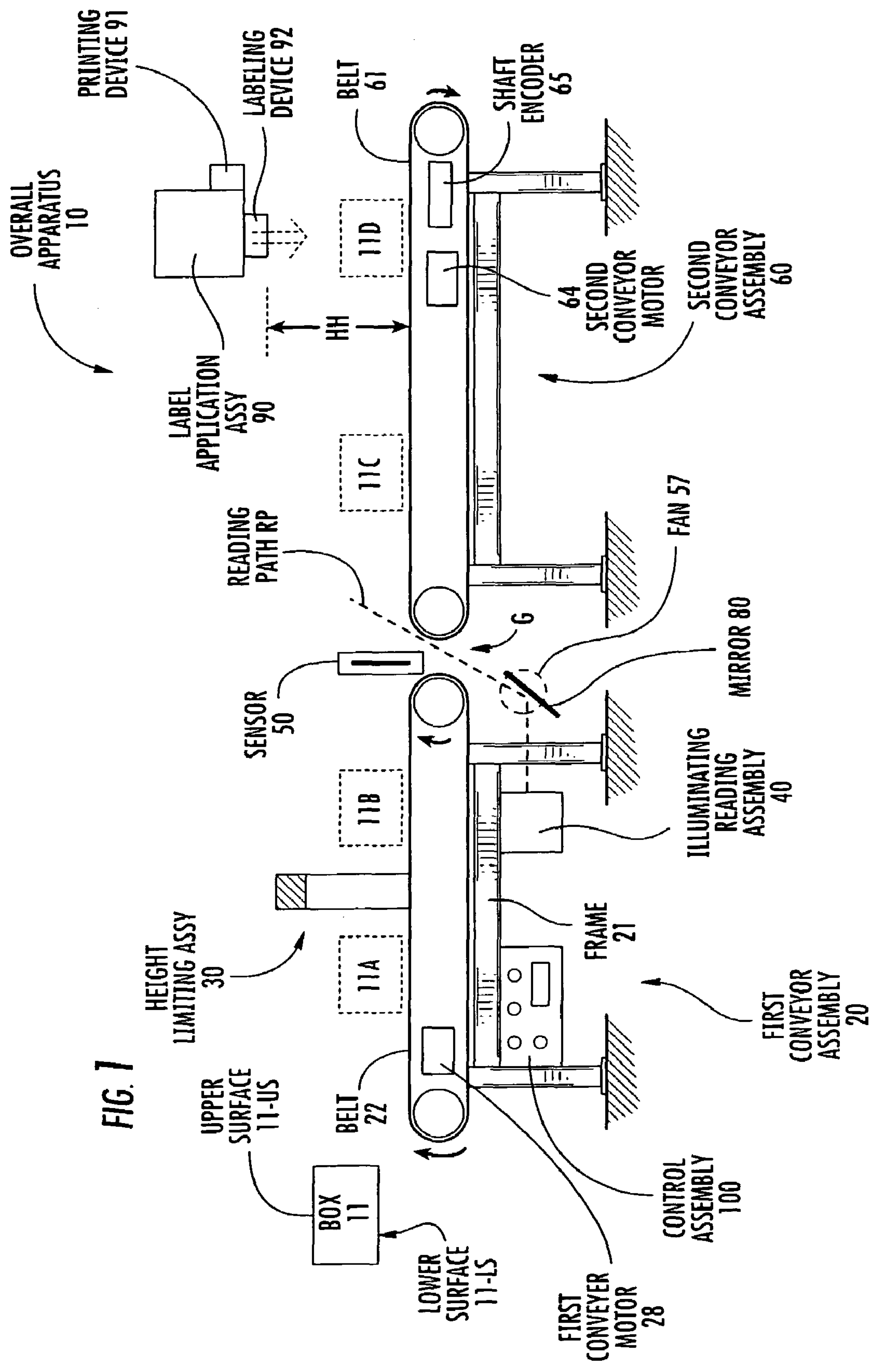
FIG. 1 is an illustrative view of the overall apparatus 10 in operation.

Details relating to particular elements and processes are now provided. The previous description of the figures may be referenced in combination with this discussion. As shown in the embodiment of the present invention illustrated in FIG. 1, a box 11 (a.k.a parcel, package, item, ect.) is placed on a belt 22 of a first conveyor assembly 20. The box 11 includes a lower surface 11-LS and an upper surface 11-US. As shown in FIG. 1, the box 11 is positioned so that the lower surface 11-LS is face down on the belt 22. The belt 22, powered by the first conveyor motor 28, conveys the box 11 underneath the height limiting assembly 30 and onto the belt 61 of the second conveyor assembly 60. As the box 11 begins crossing the gap G between the first and second conveyor belts (22, 61), the box 11 passes between sensors 50 which cause the illuminating reading assembly 40 to emit and/or receive a reading signal which extends along a reading path RP that illuminates and scans the lower surface 11-LS of the box 11. As shown in FIG. 1, the reading path RP extends from the illuminating reading assembly 40, is deflected off a mirror 80, and passes between the first and second conveyor belts (22, 61) at a distance downstream from the sensors 50. A fan 57 is shown attached adjacent the mirror 80, although in one preferred embodiment two fans are in a cofacing arrangement to blow dust or other materials away from the mirror 80. As the box 11 is transferred to the belt 61 of the second conveyor assembly 60, the control assembly 100 uses pulses sent from a shaft encoder 65 to track the box 11 as it proceeds downstream. When the box 11 passes under the label application assembly 90, and more specifically the labeling device 92, a label is printed (via the printing device 91) and blown onto the box's upper surface 11-US. Provided below are more specific descriptions of the various elements listed above.

First Conveyor Assembly 20

Figure 2:
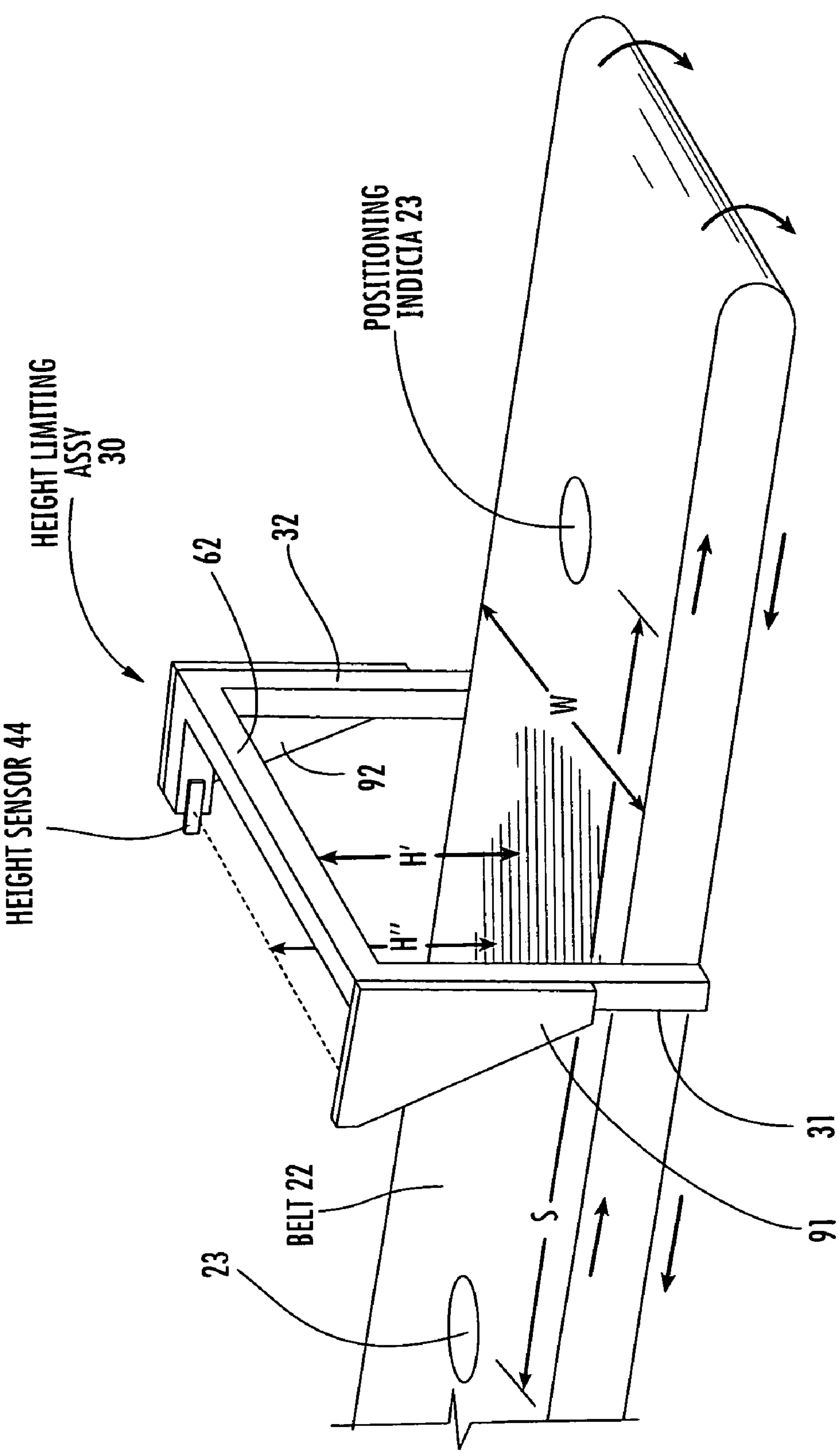
FIG. 2 is an illustrative view of the first conveyor assembly 20.

As shown in FIGS. 1 and 2, the first conveyor assembly 20 includes a frame 21, an endless first conveyor belt 22, and a height limiting assembly 30. The conveyor frame 21 and belt 22 can be off-the-shelf items. The conveyor does not have to be a belt but could be another suitable assembly such as a powered roller conveyor.

As shown in the embodiment depicted in FIG. 2, the first conveyor belt 22 includes positioning indicia 23 that are spaced apart at a distance "S." In the embodiment shown in FIG. 2, the distance S is approximately 24 inches. As described in greater detail below, the positioning indicia 23 provide guidance to an operator regarding the positioning of each package on the first conveyor belt 22.

Height Limiting Assembly 30

As shown in FIG. 1, the height limiting assembly 30 is mounted, or otherwise attached, to the frame 21 of the first conveyor assembly 20 in any manner known in the art. In the embodiment shown in FIG. 1, the height limiting assembly 30 is mounted to the frame 21 at a point along the first conveyor assembly 20 that is out of reach, or difficult to reach, for a typical operator. As described in greater detail below, positioning the height limiting assembly 30 at a considerable distance downstream will discourage an operator from attempting to circumvent the assembly. In other words, in one embodiment, the height limiting assembly 30 is positioned so that an operator can not reach across the assembly 30 to place a package onto the first conveyor belt 22 at a point past the assembly 30.

Referring now also to FIG. 2, the height limiting assembly 30 comprises a frame and a height sensor 44. In the embodiment shown in FIG. 2, the frame comprises a cross-beam 62, two supporting posts (31, 32), and two substantially triangular structural plates (91, 92). The posts (31, 32) are mounted to the frame 21 of the first conveyor assembly 20 using any manner known in the art and extend upward at a substantially perpendicular direction relative to the plane of the first conveyor belt 22. The cross-beam 62 is attached at the ends to each post (31, 32) and runs substantially perpendicular to the travel of the belt 22 at a defined height (H') above said belt 22. Each substantially triangular plate (91, 92) is attached to a post in any manner known in the art. In the embodiment shown in FIG. 2, the plates (91, 92) are mounted to each post using conventional screws (not shown).

As shown in FIG. 2, the height sensor 44 is attached to a plate 92 approximately 3 or 4 inches upstream from the cross-beam 62, although other distances are contemplated. The height sensor 44 in one embodiment comprises a photo-beam emitter and a reflector, although other means may be used. The height sensor 44 is used to detect packages that exceed a predefined height above the belt, shown in FIG. 2 as H". As shown in FIG. 2, the beam emitted from the height sensor 44 is slightly higher (relative to the belt 22) than the lower edge of the cross-beam 62. In other embodiments, the height sensor 44 and the lower edge of the cross-beam 62 are equal distances above the belt 22 of the first conveyor assembly 20. In yet another embodiment, the sensor 44 can be lower than the cross-beam 62.

To keep packages from hitting the cross-beam 62, the height sensor 44, if tripped, communicates with the control assembly 100 to simultaneously shut down the first and second conveyor belts (22, 61). If a tall package makes it past the height sensor 44 without tripping the cut off switch, the package will be prevented from proceeding downstream by the physical presence of the cross-beam 62, which provides a physical barrier to prevent tall packages from proceeding downstream. In one embodiment, the height of the cross-beam 62 is set approximately half an inch lower than a downstream printing and labeling device, discussed in further detail below. In the embodiment shown in FIG. 2, the height of the cross-beam 62 is fixed. In alternative embodiments, the height is adjustable.

It should be understood that other sensor configurations could be used to sense height. For example, a retro-reflective unit, an infrared camera, or a physical contact equipped with a limit switch can be used in alternative embodiments.

Trigger Sensor 50

Figure 3:
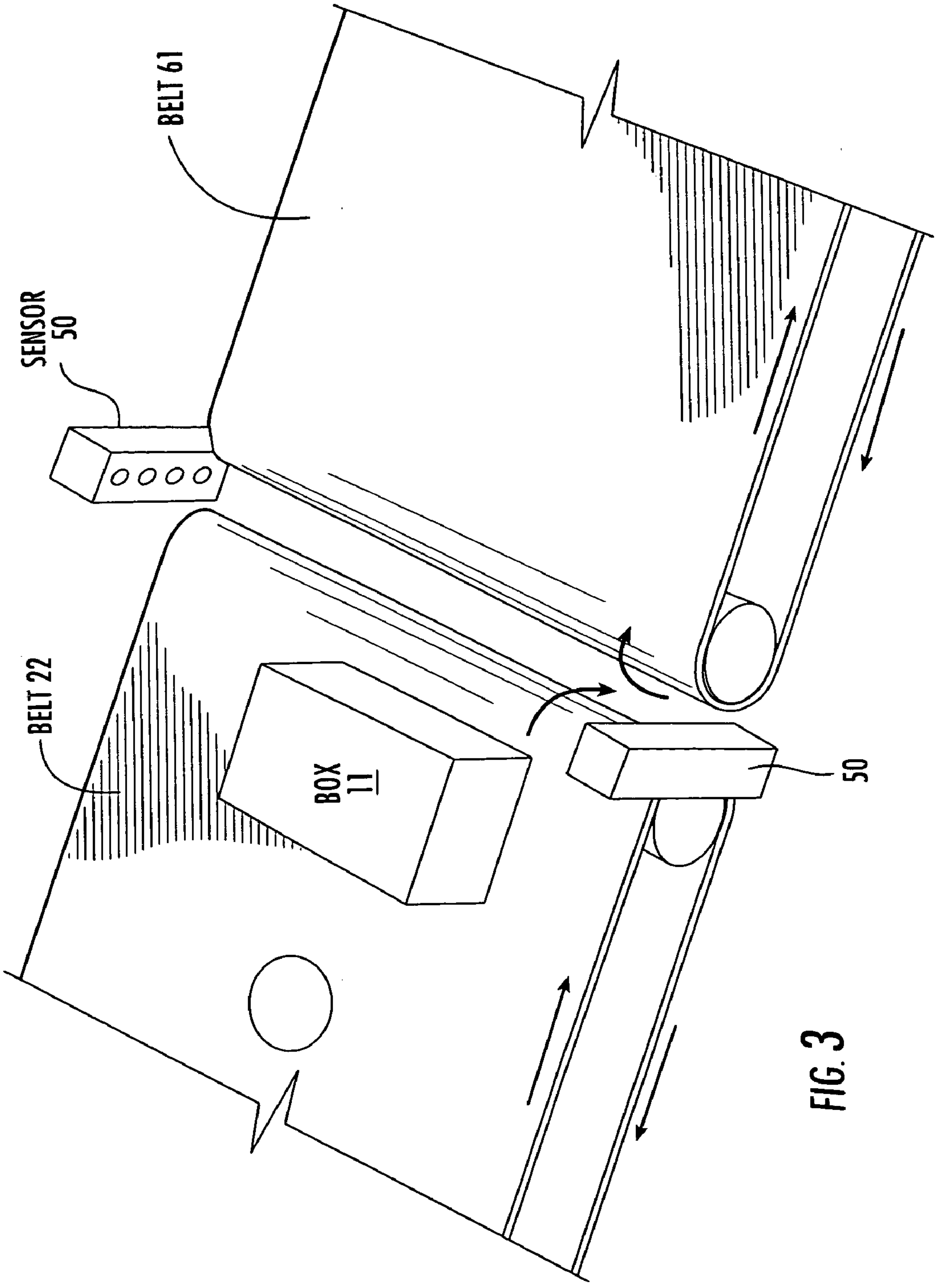
FIG. 3 illustrates the first conveyor assembly 20 in relation to the second conveyor assembly 60.

As shown in FIG. 3, cofacing trigger sensor devices 50 are mounted proximate the gap G between the first conveyor assembly 20 and the second conveyor assembly 60. These devices are configured to sense the presence of a parcel, even a substantially flat parcel such as known in the industry as a "flat," when the parcel crosses the gap G when being passed from the first conveyor assembly 20 to the second conveyor assembly 60.

The cofacing trigger sensor devices 50 combine to provide an effective "curtain" of known height and width, and provide an output signal if this curtain is broken. The transverse cross section of this curtain is represented in line form in the sensor 50 shown in FIG. 1. In FIG. 3, the sensor 50 on the far side of the belt 22 from the viewer illustrates discrete points, aligned along a line. In one embodiment, the curtain extends below the level of the first conveyor belt 22, such that even the thinnest parcels are ensured of being sensed.

The beam curtain is provided in one embodiment by the use of multi-beam emitters and sensors. In one embodiment, the trigger sensors 50 can be any conventional off-the-shelf products. For example, in one embodiment, the trigger sensors 50 are Banner Multi-Beam LS10 sensors. The LS10 system comprises two self-contained units, an emitter and a receiver. Multiple infrared LEDs in the emitter are aligned in a vertical row and strobed, i.e., turned on one at a time, in a specific sequence and at a high frequency. The receiver unit contains a matching array of phototransistors. The trigger sensors 50 cooperate to transmit a multitude of light beams that are capable of detecting the packages, as shown in FIG. 3.

In some embodiments, the light beams passing between the transmitters and receivers run diagonally across the width of the belt, so that that two or more of the beams criss-cross each other. In other embodiments, the lights beams run parallel to the width of the belt. The LS1O trigger sensors 50 are approximately 90 mm (3.5') in height and are mounted at the upstream end of the first conveyor assembly 20, one sensor one each side of the belt.

As stated above, the trigger sensors 50 are mounted so that at least part of the sensor extends below the level of the first conveyor belt 22. In the embodiment shown in FIG. 3, approximately one quarter of an inch of the sensor 50 is positioned below the level of the first conveyor belt 22. The remaining portion extends upward to a height of approximately 3 inches, although other configurations are contemplated under the overall invention.

Illuminating Reading Assembly 40

The illuminating reading assembly 40 (hereinafter referred to as "reading assembly") includes a light source and a code reading device, such as a camera. This assembly works in conjunction with a mirror 80 to read code on the lower surface 11-LS of a typical parcel such as box 11 shown in FIG. 1.

In the embodiment shown in FIG. 1, the reading assembly 40 is positioned underneath the first conveyor assembly 20 and upstream from the mirror 80. The reading assembly 40 illuminates and reads indicia attached to a package as the package crosses the gap G between the first and second conveyor belts (22, 61). In one particular embodiment, the reading assembly 40 combines an LED illumination assembly with a CCD camera to provide a substantially coplanar LED/CCD assembly. The LED assembly, which is about the same width as the belt 22 of the first conveyor assembly 20, has a slot in the middle in which the optical axis from the CCD camera passes. The optical axis will be hereinafter referred to as the "reading" axis. On each side of the slot are LED's, reflectors, and focusing devices which cooperate to create a light plane, or lighting axis, of a certain thickness. For example, in one embodiment, the LED illumination assembly creates a lighting axis that is approximately 1 inch thick. This assembly allows the reading axis and lighting axis to lie in approximately the same plane, thereby creating a substantially coplanar configuration. This configuration reduces the difficulty of creating a proper mounting angle between the line of sight of the camera and the light source. In addition, because the reading axis and light source can both be reflected in the mirror 80, the overall size of the assembly is reduced.

Other embodiments of the reading assembly 40 can be used to illuminate and read labels attached to packages. For example, in alternative embodiments of the present invention, coplanar cameras that utilize sodium or halogen lamps to illuminate the camera's line of sight can be used. In addition, labels can be scanned using non-coplanar camera and illumination assemblies. For example, in alternative embodiments, the lighting axis and line of sight of a camera can lie in different planes. Because the overall apparatus 10 is designed so that the camera will always be reading on the same plane, the light source can come from almost any direction so long as the lighting axis and reading axis intersect at the point or line that includes the plane of the belt. What is important is that the light path suitably lights up the gap G between the first and second conveyor belts (22, 61) to effectively illuminate the label attached to a package for reading purposes.

As shown in FIG. 1, the reading assembly 40 and mirror 80 are positioned relative to each other so that a light path emitted from the illuminating reading assembly is reflected off the mirror 80 and through the gap G between the first and second conveyor belts (22, 61).

The Mirror 80

In the embodiment shown in FIG. 1, a first surface reflective mirror 80 is positioned underneath the first conveyor assembly 20 and mounted at a substantially 45 degree angle. However, the mirror 80 is positioned laterally out of the way of the gap G between the first conveyor assembly 20 and second conveyor assembly 60 as to avoid being hit by any heavy objects (e.g. bolts or nails) that may fall through the gap G after being inadvertently placed on the first conveyor belt 22. In one embodiment, the mirror 80 is equipped with one or more fans 57 that create turbulence across the surface of the mirror 80 to help keep the mirror 80 clean. In one embodiment, two cofacing fans 57 are mounted to brackets (not shown). The fans 57 can be DC cooling fans, also known as "muffin" fans or "ball-bearing" fans to those skilled in the art.

Second conveyor assembly 60

Much like the first conveyor assembly 20, the second conveyor assembly 60 comprises a frame and a belt 61. This element 60 can also include off-the-shelf items. The conveyor does not have to be a belt but could be another suitable assembly such as a powered roller conveyor.

Unlike the first conveyor assembly 20, the second conveyor assembly 60 is shaft-encoded. As will be described in greater detail below, the shaft encoder 65 allows the control assembly 100 to track the position of the belt 61, which in turn allows the control assembly 100 to track the position of packages as they are conveyed downstream on the second conveyor belt 61. As shown in FIGS. 1 and 3, the first and second conveyor belts (22, 61) are positioned end to end with a gap G between, the gap being sufficiently narrow to allow passage of parcels being conveyed from the first conveyor to the second conveyor. The gap G between conveyors only needs to be as big as the reading axis. In the embodiment depicted in FIGS. 1 and 3, the gap G is approximately half an inch, although other configurations are contemplated.

Label Printing and Application Assembly 90

The label printing and application assembly 90 can be generally as known in the art, and includes a printing device 91 and a labeling device 92. As shown in FIG. 1, the label application assembly 90 is rigidly attached above the second conveyor assembly 60 and is configured to print labels, using data obtained from the reading assembly 40, and blow the printed labels onto the corresponding packages as they pass underneath. In the preferred embodiment, the label application assembly 90 is positioned relative to the second conveyor belt 61 as to blow labels downward at approximately the center of the belt, width-wise.

The printing device 91 is such as known in the art. In one embodiment, the printing device 91 comprises a SATO label printer. In other embodiments, the printing device 91 includes a blowing feature to push the label onto the label application head of the labeling device 92.

The lowest part of the label printing and application assembly 90 is shown in FIG. 1 as being a distance "HH" from the surface of the belt 61 of the second conveyor assembly 60. As is discussed in more detail elsewhere in this application, this distance HH is configured to be greater than the distance H' (shown in FIG. 2), which represents the distance at which the cross-beam 62 extends above the belt 22 of the first conveyor assembly 20.

Control Assembly 100

Figure 4:
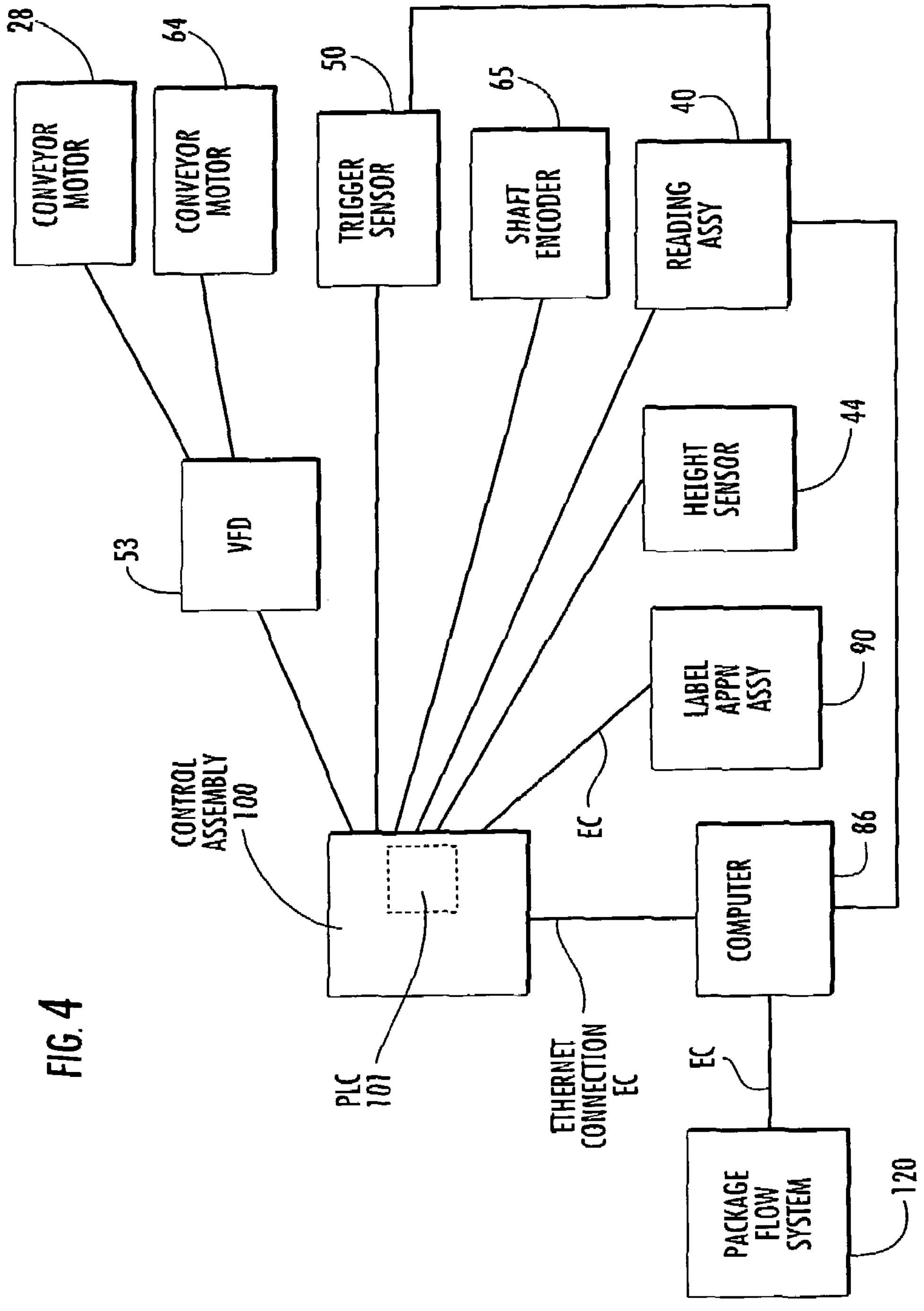
FIG. 4 shows by illustration the logical connections between the control assembly 100 and the various components of the overall apparatus 10.

In one embodiment, the control assembly comprises a PLC (programmable logic controller), as opposed to more complex and expensive equipment, which reduces the cost. The control assembly 100 can be any suitable off-the-shelf PLC. In one embodiment, the PLC is a Momentum M1E, produced by Schneider. This embodiment uses an Ethernet communications backbone to allow users to perform a wide range of functions over the Ethernet, including data acquisition, peer-to-peer communications and I/O scanning. The open architecture of a PLC (a Momentum M1E in one embodiment) allows the control assembly 100 to perform a variety of automation functions. FIG. 4 is an exemplary schematic view illustrating the operable connection and association between the control assembly 100 (shown in one example as including a PLC 101), a variable frequency drive 53 (VFD), the trigger sensors 50, the shaft encoder 65, the height sensor 44, the label application assembly 90, and a computer 86. The connection between the PLC 101 and computer 86 is through an Ethernet connection (EC) in one preferred embodiment. The functionality of the computer 86 is described in greater detail below. The connections between the PLC 101 and the various other components can be as known in the art. The PLC 101 is configured to perform a variety of functions, including but not limited to: 1) control and synchronize belt speeds via the VFD; 2) receive input from the trigger sensor; 3) receive input from the height sensor; 4) receive data from the computer; 5) pass sort instructions to the label printing and application assembly; and 6) track packages as they are conveyed on the second conveyor assembly. In other embodiments, the PLC 101 is further configured to communicate information to the reading assembly 40.

As stated above, the PLC 101 is configured to synchronize the movement of the first conveyor belt 22 with the second conveyor belt 61. As shown in FIG. 4, the PLC 101 communicates with a VFD 53 which in turn operates the conveyor motors (28, 64). Because the first and second conveyor belts (22, 61) are controlled by a single VFD 53, they can be synchronized to stop and start together. In addition, the PLC 101 is responsible for bringing the belts (22, 61) to a stop in a controlled manner. For example, when the height sensor 44 is triggered, the PLC 101 decelerates the belts (22, 61) in a controlled manner in order to prevent the packages from slipping. Maintaining package contact is especially important for the packages being conveyed on the second conveyor assembly 60. The position of each package on the second conveyor belt 61 is being monitored by the PLC 101 to ensure that the labels are applied correctly. If the packages slip during a stop, the subsequent labeling could be inaccurate.

As stated above, the control assembly 100 also monitors the position of each package located on the second conveyer belt 61. The PLC 101 tracks the position of packages through a synchronization process using data received from the shaft encoder 65 and trigger sensor 50. When a package triggers the trigger sensor 50, the PLC 101 begins counting pulses sent from the shaft encoder 65. Simultaneously, the PLC 101 receives information indicating the leading and trailing ends of the package from the trigger sensor 50 and uses the pulse count sent from the shaft encoder 65 to determine (1) the packages length and (2) the package's position on the second conveyor belt 61. As the packages continue toward the label application assembly 90, the PLC 101 continues tracking the package using pulses from the shaft encoder 65. Using this data, the PLC 101 can synchronize the movement of the package with the printing device 91 and labeling device 92. When the package is positioned underneath the label applicator, the PLC 101 will communicate with the printing device 91 so that an appropriate label is blown onto the package's upper surface.

Operational Functionality

The following section outlines the operational functionality of the apparatus 10 described above. Generally described, in one particular embodiment, the apparatus 10 can be used to sort a plurality of small packages within a package distribution center. In the package transportation industry, the need to store, manipulate and transmit package level detail is becoming increasingly important. The volume of packages grows exponentially each year, along with customer requirements for greater package tracking and faster delivery. These factors present an ongoing challenge to shippers throughout the country and shippers work continuously to automate the sortation process to meet this challenge. Much of the success of this effort depends on the shipper's ability to acquire enough detail to effectively route packages through the sortation system and ultimately, onto a shelf in a package car.

A critical stage in a package delivery system is the small sortation process, otherwise known as "smalls" to those skilled in the art. As the name suggests, the small sortation process involves the sorting of smaller sized packages. More specifically, smaller sized packages are sorted by one or more operators into one or more package bins 17. As shown in FIG. 5, a package bin 17 comprises a plurality of sortation stations F2, otherwise known as "pigeonholes" in the art. In the embodiment depicted in FIG. 5, the sortation stations are stacked in a 4×6 configuration, with each station representing a different destination. Therefore, the 4×6 package bin represents up to 24 different destinations. If an operator is responsible for loading two 4×6 bins, they could potentially be sorting between 48 different package destinations. Operators have the responsibility of ensuring that the packages are loaded into the correct package bin 17 and sortation stations F2. In the past, an operator would physically examine the destination address on each package label and determine from memory or from written pre-load charts, which bin holds packages for that address. Not surprisingly, the manual intensiveness of this bin loading process caused errors and increased training costs. In today's environment with high turnover rates, the increased training time negatively impacts the ability to create and sustain a workforce capable of providing quality loads. Therefore, in one embodiment, the apparatus 10 is used to apply human readable labels to the packages. These human readable labels include indicia (e.g. numbers and/or letters) that represent a specific bin and sortation station. The operator uses the indicia to efficiently and accurately load each package into the correct sortation station F2 without needing to remember destination address information.

Processing a Package

The following describes one embodiment in which the apparatus 10 is used to apply labels to a plurality of outbound packages. Referring to FIG. 1, an operator (not shown) will begin by placing a package (represented as Box 11) on one of the positioning indicia 23 of the first conveyer belt 22. As described above, the apparatus 10 is designed to process and label packages that meet certain predefined size limitations. Therefore, the operator is instructed to only load packages having a height that is less than the height of the height limiting assembly 30. The operator is also instructed to place packages on the first conveyor belt 22 so that the shipping label is face down. As described in greater detail below, this will allow the reading assembly 40 to read and process the label as the package crosses the gap G between the first and second conveyor belts (22, 61).

Once the operator has loaded the package onto the positioning indicia 23, the package will begin moving downstream on the first conveyor belt 22 at a predetermined belt speed. The belt speed of the first conveyor belt 22 varies depending on the desired rate of package throughput. In the preferred embodiment, in which a plurality of flats (e.g. 8×12 inch letters) are being sorted, the belt speed is set at 85 feet per minute and the positioning indicia 23 are spaced approximately 24 inches apart. In alternative embodiments, the belt speed can be either decreased or increased.

As shown in FIG. 1, if the box 11 meets the height restrictions, it will pass underneath the cross-beam 62 without incident. If however, the box 11 exceeds a predetermined height limitation, the height sensor 44 will be triggered. If the height sensor 44 is triggered, the control assembly 100, through the VFD 53, will simultaneously stop the first and second conveyor belts (22, 61). If for some reason a package passes through the height sensor's beam without triggering the belt to stop, then the cross-beam 62 of the height limiting assembly 30 will physically prevent the package from proceeding downstream. The operator is then responsible for removing any nonconforming package from the conveyor.

Assuming the package passes through the height limiting assembly 30 without incident, it will continue down the first conveyor belt 22. As the package reaches the end of the first conveyor assembly 20, it will pass between the trigger sensors 50 and break the beam curtain. Once the beam curtain is broken, the trigger sensor 50 will communicate the event to the PLC 101 and the reading assembly 40. By splitting the output signal from the trigger sensor 50 in half, the triggering event can be seen simultaneously at the PLC 101 and the reading assembly 40. Upon receiving input from the sensor 50, the PLC 101 will begin gathering data from the trigger sensor 50 and shaft encoder 65 to (1) determine the package's length and (2) track the package as it proceeds toward the label applicator. In addition, the output from the trigger sensor 50 will cause the reading assembly 40 to illuminate the gap G and scan for labels attached to the package's lower surface 11-LS. The camera (not shown) within the reading assembly 40 captures an image of the label and sends the image to a computer 86. In the preferred embodiment, the camera of the reading assembly 40 and the computer 86 are configured to perform trailing edge processing. Trailing edge processing means that the camera waits until the trailing edge of each package crosses the camera's reading axis before sending information to the computer 86 for processing. Trailing edge processing allows the camera to scan and capture the entirety of the packages lower surface 11-LS, including any and all labels that are attached.

The computer 86 uses decoding software, such as known in the art, to decode the image. In one embodiment, the computer 86 will send the decoded data to a Package Flow System (PFS) to retrieve sort instructions. In this embodiment, the PFS uses the destination zip code associated with the package's decoded tracking number to assign the appropriate sort instructions. In one embodiment, the sort instructions would be a human readable bin number such as A-2. Once ascertained by the PFS, the sort instructions are sent from the computer 86 to the PLC 101 and from the PLC 101 to the printer device 91. When the package passes underneath the label applicator, the label is blown onto the package's upper surface 11-US.

As depicted in FIG. 5, the exemplary package (shown as exemplary box 11) proceeds down the second conveyor belt 61 and is eventually handled by a second operator 12 who uses the pre-sort label, which contains the human readable sort instructions, to place the package in the appropriate sortation station. As shown in FIG. 5, the operator 12 sorts packages into a single 4×6 package bin 17 having total of 24 different sortation stations F2. In this example, the package flow system (PFS) is programmed to sort all incoming packages between the various sortation stations A1-F4. Box 11 is shown in sortation station E3. In alternate embodiments (not shown), the operator 12 could be sorting between three package bins 17 and thus up to 72 different sortation stations. In the embodiment comprising three package bins 17, the PFS will be programmed to sort incoming packages between the 72 different sortation stations. It should be noted that the operator 12 shown in FIG. 5 is different than the operator who initially loads packages onto the first conveyor belt 22. In alternative embodiments, the same operator is responsible for both loading and sorting the packages.

Alternatives and Options

As opposed to the embodiment described above, where the belt speeds remain constant throughout the sorting process, alternative embodiments are designed to incorporate a more adaptive process. In the package delivery industry, efficiency of the employees and equipment is paramount to a successful business. With this in mind, the apparatus 10 described above could be programmed to adapt to the work habits of a particular operator. In one embodiment, the apparatus 10 could adapt in real-time. For example, if the operator is having difficulty hitting all the positioning indicia 23 at the current belt speed, the control assembly 100 could automatically slow down the belts (22, 61). Likewise, if the operator is hitting every positioning indicia 23, the control assembly 100 could speed the belts up and thereby increase the number of packages processed per hour. The apparatus's adaptive nature produces maximum efficiency for both the operator and the machine.

In another embodiment, the apparatus 10, and more specifically the computer 86, can be further configured to automatically reduce the speed of the belts (22, 61) if the number of packages being placed on the belts exceeds the processing capabilities of either the package flow system 120 or the printing device 91. In other words, if the operator is not using the positioning indicia 23 correctly, i.e., the operator is spacing the packages at a distance S' that is significantly shorter than the preferred spacing distance S, as shown in FIG. 2, it is possible to create a package flow that exceeds the apparatus's 10 processing capability. In this situation, the computer 86 will interface with the PLC 101 which in turn will cause the belt speeds for both the first and second conveyor belts (22, 61) to be reduced. In reality, any shortage of processing time can be accommodated by adjusting the speed of the second conveyor belt 61 only. However, because the belt speeds of the preferred embodiment remain synchronized, the speeds of both the first and second conveyor belts (22, 61) are both reduced when the sensor 50 detects an influx of tightly spaced packages crossing the gap G between the first and second conveyor belts (22, 61).

In other embodiments, the control assembly 100 could have set speeds associated with each operator. When the operator starts a shift, they will log in and the control apparatus will use the operator's past performance history to set a preferred belt speed. In yet another embodiment, the belt speed could be controlled by the operator directly. If the operator needs to complete a sort as quickly as possible, he or she could manually increase the speed of the belts. Likewise, the operator could also manually decrease the speed of the belts.

In additional embodiments, the apparatus 10 could include devices for providing the operator with feedback associated with his or her performance. In one such embodiment, the apparatus 10 could provide the operator with a display to indicate the operator's efficiency rate, defined by the number of packages labeled per hour. In another embodiment, the apparatus 10 could include horns or lights that will indicate to the operator when they miss a positioning indicia 23.

CONCLUSION

The resulting apparatus provides an efficient and inexpensive means of labeling and sorting a plurality of packages. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for handling a plurality of parcels each having first indicia thereon on a first side and for providing second indicia atop a second side of said parcel, said method comprising the steps of, for each said parcel:

conveying said parcel on a first conveying device such that said first side of said parcel is directed towards a first direction and said parcel is conveyed along said first conveying device, wherein said first conveying device is configured to accept said parcel from an outside source;

transferring said parcel on said first conveying device to a second conveying device across a gap between said first and second conveying devices and after said step of transferring, conveying said parcel along said second conveying device;

reading via an illuminating reading assembly said first indicia on each said first side of said parcel as said parcel is transferred across said gap between said first conveying device and said second conveying device; and providing said second indicia atop said second surface of said parcel while said parcel is atop said second conveying device and traveling along said second conveying device, wherein:

said illuminating assembly comprises: (A) a light source comprising an opening through approximately a middle of said light source and (B) an indicia reading device; and said reading step comprising:

using said light source to illuminate said first indicia along a lighting axis; and while said light source is illuminating said first indicia along said lighting axis, using said indicia reading device to read said first indicia along a reading axis that passes through said opening in said light source and lies in approximately a same plane as said lighting axis, thereby creating a substantially coplanar configuration between said reading axis and said lighting axis.

2. The method as claimed in claim 1, wherein said second indicia is provided atop said second surface of said parcel by use of an indicia adding device blowing one or more labels through air to contact said parcel, said indicia adding device including a holding portion configured to hold said one or more labels prior to being blown, said holding portion remaining a substantially constant label holding portion distance above a portion of said second conveying device proximate a location said parcel is labeled, while said parcel is atop said second conveyor and traveling along said second conveying device.

3. The method as claimed in claim 1, further comprising the step of using a height sensor positioned upstream of said gap to determine if said parcel atop said first conveying device is above a certain height, and if so for terminating conveying of said first and second conveying devices.

4. The method as claimed in claim 1, further comprising the step of sensing a rate of said parcel being conveyed on said first conveying device, and wherein said first and second conveying devices are slowed down or speeded up if said rate is above or below, respectively, a predetermined rate.

5. The method as claimed in claim 1, wherein said second indicia is placed at a first location on said second surface of said parcel which substantially opposes a second location said first indicia is located on said first surface of said parcel.

6. The method as claimed in claim 1, wherein said height of said parcel is checked to be less than a predetermined height prior to crossing said gap.

7. The method as claimed in claim 1, wherein said second indicia can vary given input of said first indicia, depending on contents of a database lookup.

8. The method as claimed in claim 1, further comprising the step of sensing a rate of said parcel being conveyed on said first conveying device, and wherein said first and second conveying devices are slowed down or speeded up if said rate is above or below, respectively, a predetermined rate, and wherein an operator signal is generated to alert an operator as to how said operator's performance compares to a predetermined performance value.

* * * * *

UNITED STATES PATENT AND TRADEMARK OFFICE

CERTIFICATE OF CORRECTION

PATENT NO. : 7,632,367 B2
APPLICATION NO. : 11/104870
DATED : December 15, 2009
INVENTOR(S) : Steven L. Smith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 687 days.

Signed and Sealed this

Second Day of November, 2010

David J. Kappos

*Director of the United States Patent and Trademark Office*